United States Patent [19]

Sutherland

[11] Patent Number: 5,390,780

[45] Date of Patent: Feb. 21, 1995

[54] CONVEYING APPARATUS

[75] Inventor: Brian R. Sutherland, Transvaal, South Africa

[73] Assignee: Techemet Incorporated, Transvaal, South Africa

[21] Appl. No.: 91,041

[22] Filed: Jul. 14, 1993

[30] Foreign Application Priority Data

Jul. 15, 1992 [ZA] South Africa ............... 92/5268

[51] Int. Cl.6 .................................. B65G 19/00
[52] U.S. Cl. .................. 198/720; 198/716; 198/733
[58] Field of Search ............... 198/720, 733, 734, 716, 198/580

[56] References Cited

U.S. PATENT DOCUMENTS 2,607,468  8/1952  Hall .................... 198/716

FOREIGN PATENT DOCUMENTS

| 554996 | 7/1932 | Germany . | |
|---|---|---|---|
| 655995 | 1/1938 | Germany . | |
| 662323 | 7/1938 | Germany . | |
| 706976 | 10/1970 | South Africa . | |
| 829270 | 12/1982 | South Africa . | |
| 883200 | 5/1988 | South Africa . | |
| 524058 | 7/1940 | United Kingdom | 198/716 |
| 549295 | 11/1942 | United Kingdom . | |
| 930560 | 7/1963 | United Kingdom | 198/716 |

Primary Examiner—Joseph E. Valenza

[57] ABSTRACT

A conveying apparatus 10 for transferring material from a feeding station 12 to a series of discharge stations 14 is composed of a feed passageway 18 and a return passageway 20. Located in the passageways 18, 20 is an endless chain 28 carrying a plurality of scrapers 30 for urging the material around the passageways. Bypass channels 22, 24 are located between the opposed end of the feed passageway 18 and return passageway 20 to provide for recycling of material. The essence of the conveying apparatus is that material fed from the feeding station 12 which is not discharged through the discharge stations 14 falls through the bypass channel 22 into the return passageway 20 where it is conveyed to the bypass channel 24 where it rejoins the feed passageway 18.

9 Claims, 1 Drawing Sheet

U.S. Patent
Feb. 21, 1995
5,390,780
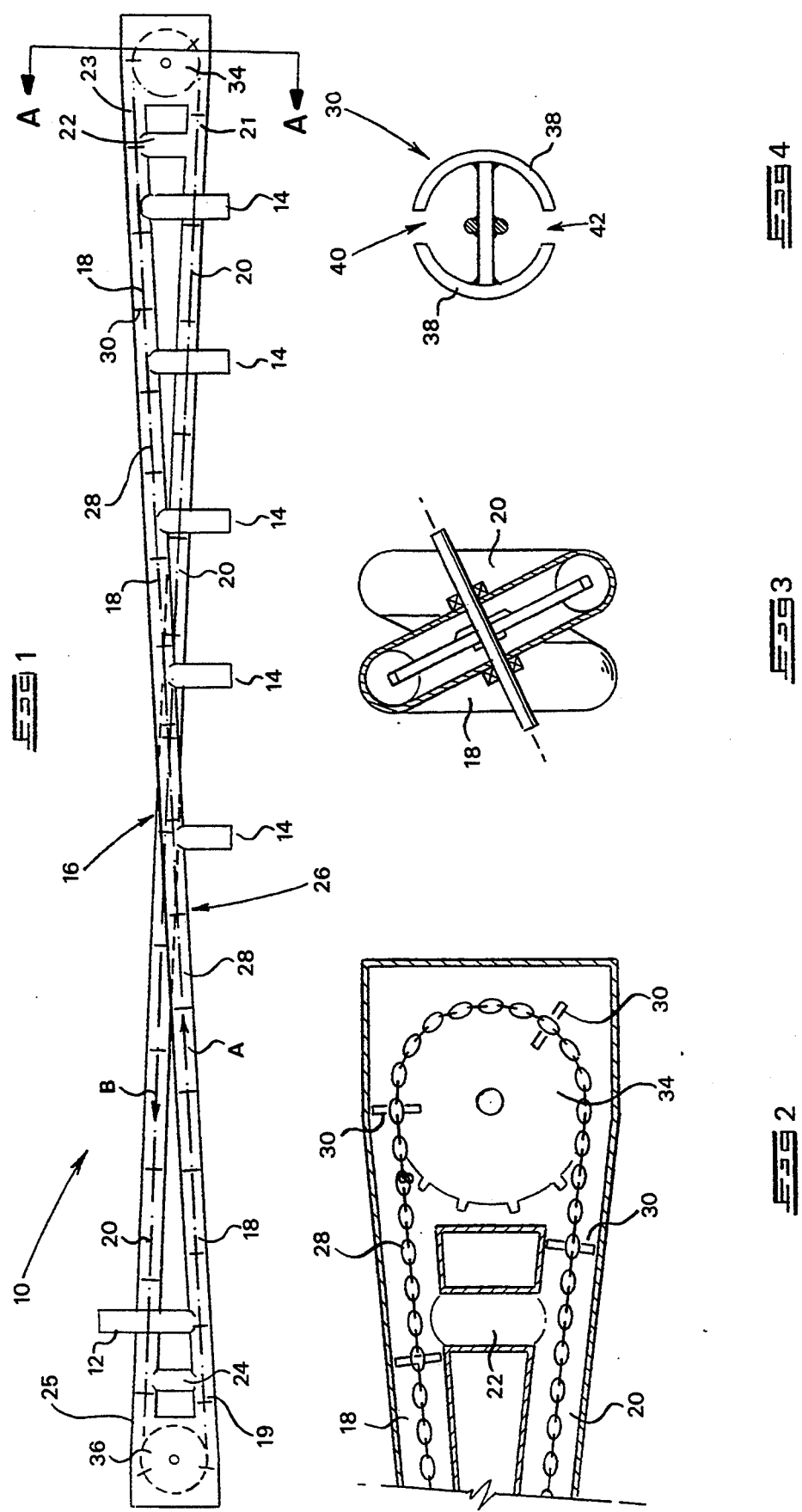

5,390,780

CONVEYING APPARATUS

BACKGROUND TO THE INVENTION

This invention relates to a conveying apparatus for transferring material from a supply zone to a receiving zone.

Many conventional material conveying systems operate in an open circuit fashion in the sense that the input and output of the system are quite discrete and the output of the system has no controlling effect over the input. A problem with this type of arrangement is that if the output should become choked or otherwise cease to function, material is still fed in at the input which results in overflow conditions. This is clearly undesirable.

Furthermore, if such a conventional system has several outputs and down-time is required on one of them, the entire system has to be switched off since it cannot cater for a circulating load.

The present invention seeks to address these problems.

SUMMARY OF THE INVENTION

According to the invention there is provided a conveying apparatus for transferring material from a supply zone to a receiving zone, the apparatus comprising:
a feeding station for feeding material into the conveying apparatus, at least one discharge station upstream of the feeding station for discharging material from the conveying apparatus, conveying and recycling means for conveying material from the feeding station to the discharge station or stations and for recycling excess material not discharged at the discharge station or stations back to or near the feeding station.

The conveying and recycling means may comprise a feed passageway and a return passageway, each passageway having a first end and a second end, the feeding station being located at or near the first end of the feed passageway and the discharge station or stations being located upstream of the feeding station preferably on the feed passageway but optionally on the return passageway, and the return passageway defining a path for the recycled excess material, and moving means conveying the material from the feeding station to the discharge station or stations and for recycling the excess material back to or near the feeding station.

The feed passageway and the return passageway may be in the form of elongate tubes arranged in a figure of eight or crossover configuration with the first end of the feed passageway located below the second end of the return passageway and the second end of the feed passageway located above the first end of the return passageway, such that the feed passageway and the return passageway extend upwardly in opposed directions to each other.

The conveying apparatus may also include two bypass channels, the first bypass channel connecting the second end of the feed passageway to the first end of the return passageway and the second bypass channel connecting the second end of the return passageway to the first end of the feed passageway, so that the ends of the passageways are in communication with each other.

The bypass channels allow transferred material at the end of one passageway to fall under gravity into the other passageway.

The moving means may comprise an endless flexible element carrying a plurality of scrapers for urging the material along the feed passageway and the return passageway. For example, the flexible element may be a McKinnon-type chain extending along the feed passageway and the return passageway and being mounted on sprocket wheels located at opposite ends of the conveying apparatus, one or both of the sprocket wheels being driven to cause movement of the chain and scrapers to urge the material along the feed passageway and the return passageway.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in more detail by way of example only with reference to the accompanying drawings which are given by way of illustration only, and thus are not limitative of the present invention, and in which:

FIG. 1 shows a pictorial side view of a conveying apparatus according to the invention, FIG. 2 shows an enlarged sectional view of one end of the conveying apparatus shown in FIG. 1, FIG. 3 shows a sectional view of the conveying apparatus taken at the line A—A in FIG. 1, and FIG. 4 shows an enlarged view of a scraper formation 30 shown in FIG. 1.

BRIEF DESCRIPTION OF EMBODIMENTS

FIG. 1 shows a conveying apparatus 10 according to the invention for transferring material from a supply zone to a receiving zone. The apparatus 10 comprises a feeding station or feed point 12 for feeding material into the conveying apparatus 10 and a series of, in this case five, discharge stations 14 for discharging material from the conveying apparatus 10. Material is fed in at the feeding station 12 and then travels in the direction of arrow A up to the discharge stations 14 where it can be fed in to bags or containers and the like (not shown). The apparatus 10 has recycling means, shown generally at 16, for recirculating excess material not discharged at the discharge stations 14 back to or near the feeding station 12 in the direction of arrow B.

The apparatus 10 comprises a feed passageway 18 and a return passageway 20. The feeding station 12 and discharge stations 14 are provided on the feed passageway 18 and the return passageway 20 defines a path for the recycled excess material. In this version of the invention, the passageways 18 and 20 are in the form of elongate tubes arranged in a figure of eight or crossover configuration such that the feed and return passageways 18, 20 extend from respective beginning and end portions (or first ends 19, 21 and second ends 23, 25 respectively) in opposed directions to each other with each passageway 18, 20 being disposed at an inclined angle to the horizontal. The preferred construction utilises circular cross-section pipes of metal or plastics material. However, square or other geometric cross-sections could be used.

The conveying apparatus 10 includes two bypass channels 22 and 24 provided at opposed ends of the feed and return passageways 18 and 20. As a result, the second end 23 of the feed passageway 18 is in communication with the first end 21 of the return passageway 20. Similarly, the bypass channel 24 joins the second end 25 of the return passageway 20 with the first end 19 of the feed passageway 18. The bypass channels 22, 24 allow transferred material at the end of one passageway to fall under the action of gravity to the beginning of the other passageway. Thus, in operation of the illustrated conveying apparatus 10, material which is fed in at the feeding station 12 will travel in the direction of arrow A up the feed passageway 18 to the discharge stations 14 where the material is dispensed as described above. Excess material which is not dispensed via the discharge stations 14 will continue up the feed passageway 18 to the bypass channel 22 where it will fall under the action of gravity into the return passageway 20 to be recycled up to the bypass channel 24 at the end of the return passageway 20. At this point, it will fall under the action of gravity at or near the feeding station 12 to be retransferred up the feed passageway 18 to the discharge stations 14 once again.

As mentioned above, the conveying apparatus 10 comprises means 16 for recycling the excess material. The apparatus 10 also comprises conveying means, shown generally at 26 for conveying material from the feeding station 12 to the discharge stations 14. In the illustrated apparatus 10; the recycling and conveying means 16 and 26 are provided in the form of an endless flexible element 28 carrying scrapers 30 for urging the material along the feed and return passageways 18 and 20. The flexible element 28 is typically in the form of a McKinnon-type chain. The chain is mounted on toothed sprocket wheels 34 and 36 which are provided at opposite ends of the conveying apparatus 10. One (or optionally both) of the sprockets are driven to cause the chain to progress through the feed and return passageways 18, 20 in an endless fashion thereby to transfer the material in a closed circuit defined by the feed and return passageways 18 and 20 and the bypass channels 22 and 24.

An enlarged pictorial view of a scraper 30 is shown in FIG. 4. It will be seen that the scraper 30 has opposed limbs 38 of substantially semi-circular configuration with the limbs 38 defining between them opposed gaps 40 and 42. These gaps 40, 42 allow the scraper 30 to pass over the sprocket wheels 34, 36 as the scraper progresses on its path around the conveying apparatus 10. It will be noted that the direction of travel of the conveyor chain and scrapers are always towards the top of either sprocket wheel 34, 36. The scrapers 30 are welded or otherwise clamped or attached to the chain and the scraper design can be altered to suit the product and the operating angles of the feed and return passageways 18 and 20. Similarly, although a McKinnon-type chain is illustrated in the accompanying drawings, roller chain or other types of metal or plastic rope could equally well be employed.

In an alternative arrangement, the discharge stations 14 may be located on the return passageway 20. In this case, material which is fed in at the feeding station 12 will travel up the feed passageway 18, through the bypass channel 22 and then on the return passageway 20 to the discharge stations 14. Any excess material not discharged will fall through the bypass channel 24 to at or near the feeding station 12 to be retransferred up the feed passageway 18.

An advantage of the illustrated apparatus is seen to reside in the fact that any excess material not withdrawn from the conveyor through the discharge stations 14 is recycled without contacting the sprocket wheels 34 and 36 and any associated drive mechanisms. Furthermore, material can be supplied to a number of discharge stations 14 at full capacity even if one or more of the discharge stations is temporarily closed. In such a situation, excess material is merely recycled back to the feeding station 12. The conveyor axis may be set in a generally horizontal plane or at an angle to the horizontal to allow material to be elevated to even greater heights during conveying. The preferred speed of operation is between 3 and 10 meters per minute but speeds outside these limits may be acceptable depending on the type of material being conveyed. The illustrated apparatus would be particularly useful for transferring particulate material such as coal, grain or salt.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim,

1. A conveying apparatus for transferring material from a supply zone to a receiving zone, the apparatus comprising:

a feed passageway and a return passageway, each passageway having a first end and a second end, the material being moved from the first end to the second end of each passageway, the passageways comprising elongated tubes arranged in a crossover configuration with the first end of the feed passageway located below the second end of the return passageway and the second end of the feed passageway located above the first end of the return passageway such that the feed passageway and the return passageway extend upwardly in opposed directions to each other, a feeding station for feeding material into the conveying apparatus located at or near the first end of the feed passageway, one or more discharge stations for discharging material from the conveying apparatus located downstream of the feeding station on the feed passageway, the return passageway defining a path for recycled excess material, two bypass channels, the first bypass channel connecting the second end of the feed passageway to the first end of the return passageway and the second bypass channel connecting the second end of the return passageway to the first end of the feed passageway, and moving means for conveying material from the feeding station to the one or more discharge stations and for recycling excess material not discharged at the one or more discharge stations, the moving means comprising an endless flexible element carrying a plurality of scrapers for urging the material along the feed passageway and the return passageway.

2. The conveying apparatus according claim 1 wherein the endless flexible element comprises a chain extending along the feed passageway and the return passageway and being mounted on sprocket wheels located at opposite ends of the conveying apparatus, one or both of the sprocket wheels being driven to cause movement of the chain and scrapers to urge the material along the feed passageway and the return passageway.

3. The conveying apparatus according to claim 2, wherein the scrapers are attached to the endless flexible element by a central member, each of the scrapers includes a central member extending between two substantially semi-circular limbs, the two limbs define two gaps therebetween, the sprocket wheels passing through one of the gaps defined between the limbs when the scrapers pass over the sprocket wheels.

4. The conveying apparatus according to claim 1, wherein a plurality of discharge stations are provided on the feed passageway, the moving means passing each of the discharge stations.

5. The conveying apparatus according to claim 1, wherein the first end of the feed passageway is located generally at a same height as the first end of the return passageway.

6. The conveying apparatus according to claim 1, wherein the second end of the feed passageway is located generally at a same height as the second end of the return passageway.

7. The conveying apparatus according to claim 1, wherein the cross-over configuration for the passageways comprises the feed passageway and the return passageway being located side-by-side.

8. The conveying apparatus according to claim 1, wherein the cross-over configuration results in the conveying apparatus having a figure eight shape.

9. The conveying apparatus according to claim 1, wherein the material is feed through the first bypass channel to the return passageway by gravity and wherein the material is feed through the second bypass channel to the feed passageway by gravity.

* * * * *